June 20, 1933.  R. ROCKENDORF  1,914,818
DIRIGIBLE HEAD LAMP FOR MOTOR VEHICLES, AUTOMATICALLY OPERATED
Filed Nov. 13, 1931

Inventor:
Rudolf Rockendorf by
Karl Viertel Att'y

Patented June 20, 1933

1,914,818

UNITED STATES PATENT OFFICE

RUDOLF ROCKENDORF, OF BAD-LAUCHSTADT, GERMANY

DIRIGIBLE HEAD LAMP FOR MOTOR VEHICLES, AUTOMATICALLY OPERATED

Application filed November 13, 1931, Serial No. 574,784, and in Germany November 16, 1930.

My invention relates to dirigible head lights for motor vehicles of the type in which the head lamps are capable of being swung around vertical pivots and are cooperatively associated with the steering gear of the vehicle through a fluid cushion controlled actuating mechanism.

The principal object of my invention is to provide an improved head light actuating mechanism of the type set forth which is of extremely simple design and which will be safe against becoming damaged and becoming inoperable through accidental troubles arising from various unforeseen causes including excessive friction, jamming, blocking etc.

Another object of the invention is to thus design the head light actuating mechanism so that it can be connected with and disconnected from the steering gear at will by hand actuated means operable from the driver's seat.

Another object of the invention is to provide simple means for changing and adjusting within close limits the ratio at which the head lamps are automatically swung aside viz. in proportion to the steering gear and the front wheels respectively, so that the head lamps will throw their light beams as early as desired into the approaching curved section of the road before the front wheels are fully turned in the direction of that curve.

The nature and scope of the invention are outlined in the appended claims and will be more fully understood from the following claims taken together with the accompanying drawing in which Fig. 1 is a side elevation showing diagrammatically the principal parts of the steering gear and the head lamp actuating mechanism by way of an example;

Figure 1:
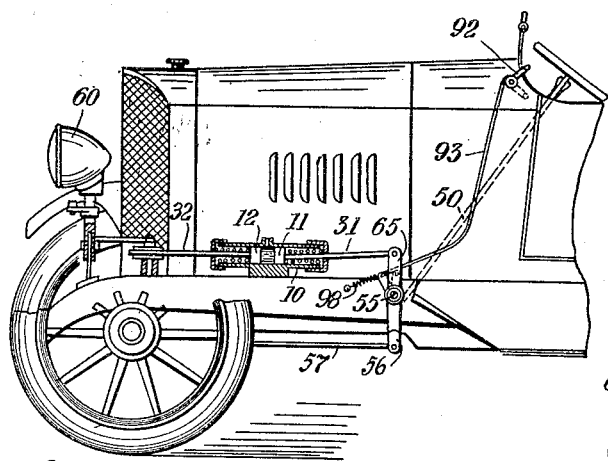
Figure 2:
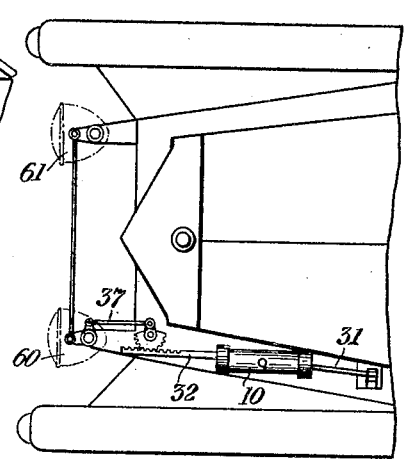
Fig. 2 is a plan of the said mechanism.
Figure 2A:
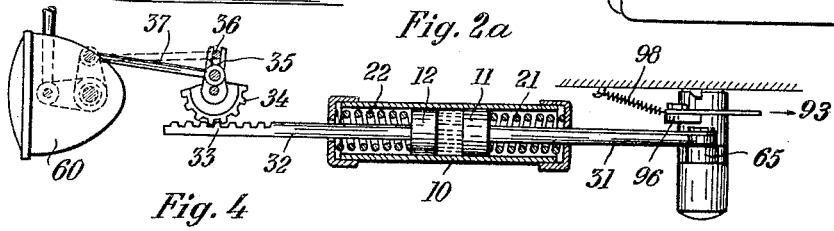
Fig. 2a is another plan made in a larger scale.

Referring to Figs. 1, 2 and 2a of the drawing the actuating mechanism for turning the head lights 60, 61 of the motor vehicle about their vertical axis comprises a cylinder 10 containing preferably glycerol or another liquid resistive to freezing and a pair of pistons which are arranged opposed to each other within said cylinder 10 and are kept in engagement through the intermediary column of liquid and springs 21, 22, the tension of which is capable of adjustment by means of cap screws threaded on the ends of said cylinder 10. Whereas piston 12 is cooperatively connected with the mechanism proper for turning the head lights about their axis by rods 32, 37 and an intermediary gear capable of adjustment, as will be explained hereinafter,—the other piston 11 is cooperatively connected by a rod 31 and a lever 65 with the steering mechanism of the vehicle, comprising steering wheel and rod 50, a worm gear 51, 52, an oscillatory journal 55 keyed to a worm wheel 52, and a lever 56 keyed to said journal 55 and being associated with the running wheels of the vehicle by drag link 57 and other members known per se—not shown.

According to this invention a safety coupling capable of self-disengagement in cases of emergency is provided for connecting in a non-positive manner the steering gear and the head light actuating mechanism: Said safety coupling being responsive to accidental excessive forces of resistance which may occur within the moving elements of the head light actuating mechanism as the result of undue friction, jamming, blocking and like casual causes.

In the embodiment of my invention shown in the drawing by way of an example the said safety coupling comprises a toothed disc 85, rigidly attached to the oscillatory main journal 55 of the steering gear and a notched lever 65 which is cooperatively and displaceably arranged relatively to the said toothed disc 85 and which represents the principal actuating member of the head light actuating mechanism.

The toothed portion of the disc 85 is provided with sloping faces engaging recesses of corresponding shape in the lever 65. Disc 85 is rigidly secured to the oscillatory main journal 55 of the steering gear by a bolt 86 which is preferably made in one piece with the disc and is formed with a threaded hole. The said bolt 86 is screwed upon a threaded pin, projecting from the journal 55, and is keyed thereto by a cotter pin 87 or the like.

A spring 66 is provided for throwing into engagement the notched lever 65 and the toothed disc 85, said spring being supported by nuts which are screwed on bolt 86 and represent convenient means for adjusting the tension of spring 66.

Figure 3:
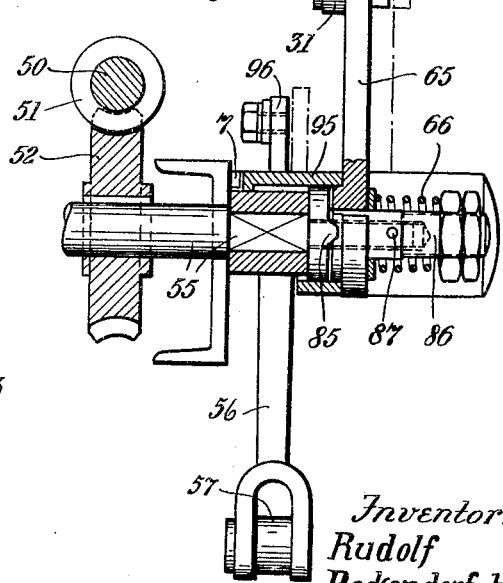
Fig. 3 is a cross section taken vertically through the safety coupling and switch interconnecting the steering gear and the head light actuating mechanism.

It will be seen in Fig. 3 that the safety coupling described is capable of self-disengagement in as much as the lever 65 which snugly fits around bolt 86 is automatically thrown out of engagement by the toothed disc should accidental excessive forces of resistance, friction etc., occur in the head light actuating mechanism. In this manner both the head light actuating mechanism is protected against damages and the steering gear is rendered safe against becoming accidentally inoperative.

According to this invention in addition to the automatic coupling and safety means described hereinbefore switching means under the control of the driver of the vehicle are provided for throwing at will into and out of operation the head light actuating mechanism.

In the embodiment of my invention shown by way of an example in the drawing the said switching means comprise a notched sleeve 95 which snugly fits around the toothed disc 85 so as to be free of being swung around the latter and which bears with its front face against lever 65 and with the notched portion 97 of its rear face against a cam 7 having a sloping working face and being rigidly fixed to the frame of the vehicle.

Figure 4:
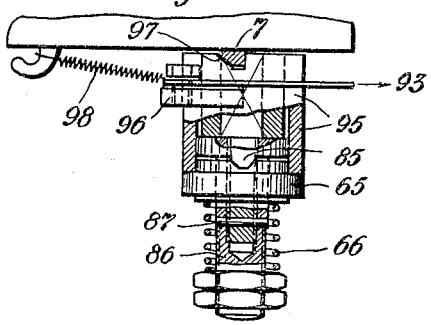
Figs. 4 and 5 are cross sections taken horizontally through the coupling and switch interconnecting the steering gear and the head light actuating mechanism; showing the principal parts in operative and in inoperative position respectively.
Figure 5:
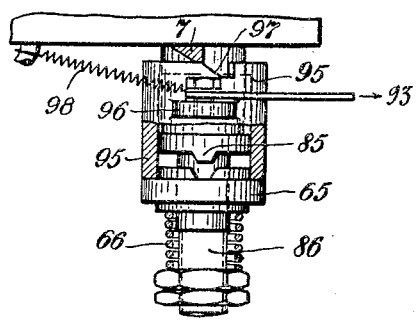

As seen in Figs. 4 and 5 by the action of said cam 7 the sleeve 95, on being swung around its axis, is longitudinally displaced so as to throw back and release the notched lever 65 from the toothed disc 85 against the action of spring 66, as indicated in dot and dash lines also in Fig. 3.

In the embodiment of my invention shown in the drawing by way of an example the means for swinging around said sleeve 95 comprise an arm 96 projecting therefrom, a spring 98 attached to said arm and a Bowden wire 93 adapted to be operated by a hand lever 92. By releasing the Bowden wire 93 the sleeve 95 returns into its inoperative position by the action of spring 98, as shown in Fig. 4.

According to this invention an intermediary gear and power transmission device capable of adjustment is provided for changing and adjusting within close limits the ratio at which the head lights 60, 61 are automatically swung aside from their zero position in proportion to the steering gear, so that the head lights will throw their light beams as early as desired into the approaching curved section of the road before the front wheels are fully turned in the direction of that curve.

In the embodiment of my invention shown by way of an example in Figs. 2 and 2a the said intermediary gear comprises a toothed rack 33 attached to piston rod 32, a pinion 34, and a crank 35, which is adjustably mounted on the shaft of pinion 34. The crank pin 36 is displaceably mounted in a slot of said crank and is cooperatively associated by connecting rod 37 with a system of levers provided for turning around the head lights 60, 61.

By changing the actual length of the crank 35—as indicated in dotted lines in Fig. 2a—and its angular position relatively to pinion 34 by clamping means known per se—not shown—the ratio at which the head lights 60, 61 are swung aside from their zero position can be adjusted within close limits.

Various changes and modifications may be made in the design and cooperation of the structural elements of head light actuating mechanism of the type described above without deviating from the spirit and the salient features of this invention and without sacrificing any advantages inherent thereto.

What I claim is:

1. In an actuating mechanism for dirigible head lights of motor vehicles, a safety coupling comprising a toothed disc rigidly attached to the oscillatory main journal of the steering gear, the teeth of said disc having sloping faces, a notched lever, displaceably arranged relatively to the toothed disc for cooperation with the latter, a spring adapted to keep in engagement the notched lever and the toothed disc, and means for adjusting the tension of said spring.

2. Actuating mechanism for dirigible head lights of motor vehicles having the features outlined in claim 1, in which switching means are provided comprising a notched sleeve, slidably and rotatably arranged relatively to the oscillatory main journal of the steering gear, a stationary cam having a sloping working face and engaging the notched portion of the said sleeve, and means under the control of the driver for swinging the said sleeve about its central axis.

3. Actuating mechanism for dirigible head lights of motor vehicles having the features outlined in claim 1, in which switching means are provided comprising a notched sleeve slidably and rotatably arranged relatively to the oscillatory main journal of the steering gear, a stationary cam having a sloping working face and engaging the notched portion of the said sleeve, and means under the control of the driver for swinging the said sleeve about its central axis, said means comprising an actuating arm projecting from said sleeve, a spring attached to said arm, a hand lever in reach of the driver of the vehicle and a Bowden wire interconnecting the said hand lever and arm.

In testimony whereof I have signed my name to this specification.

RUDOLF ROCKENDORF.